(12) United States Patent
Ogawa

(10) Patent No.: US 9,181,966 B2
(45) Date of Patent: Nov. 10, 2015

(54) CLAMP

(75) Inventor: Takaya Ogawa, Yokohama (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 204 days.

(21) Appl. No.: 13/879,196

(22) PCT Filed: Oct. 14, 2011

(86) PCT No.: PCT/JP2011/073716
§ 371 (c)(1),
(2), (4) Date: May 9, 2013

(87) PCT Pub. No.: WO2012/050204
PCT Pub. Date: Apr. 19, 2012

(65) Prior Publication Data
US 2013/0221185 A1    Aug. 29, 2013

(30) Foreign Application Priority Data

Oct. 15, 2010 (JP) ................................ 2010-232220

(51) Int. Cl.
*F16L 3/22* (2006.01)
*F16B 2/02* (2006.01)
(Continued)

(52) U.S. Cl.
CPC ............... *F16B 2/02* (2013.01); *B60R 16/0215* (2013.01); *F16L 3/13* (2013.01); *F16L 55/035* (2013.01); *F16B 21/086* (2013.01)

(58) Field of Classification Search
CPC ......... F16L 3/223; F16L 3/233; F16L 55/035; F16L 3/13; F16B 21/086; F16B 2/02
USPC ................. 248/71, 65, 68.1, 74.2, 74.1, 74.3, 248/316.1, 634, 73
See application file for complete search history.

(56) References Cited

U.S. PATENT DOCUMENTS

| 5,129,607 | A |   | 7/1992 | Satoh |
| 5,184,794 | A | * | 2/1993 | Saito ............................ 248/68.1 |

(Continued)

FOREIGN PATENT DOCUMENTS

| CN | 1475689 A | 2/2004 |
| DE | 4127089 A1 | 2/1992 |

(Continued)

OTHER PUBLICATIONS

China Patent Office, "Office Action for CN 201180059308.8," Jul. 14, 2014.

(Continued)

*Primary Examiner* — Todd M Epps
(74) *Attorney, Agent, or Firm* — Manabu Kanesaka

(57) ABSTRACT

In a clamp, a holding portion provided with an opening for inserting a long object (for example, a pipe) such as the pipe and the like, and holding the long object (for example, the pipe); a main body portion disposed leaving a certain space on an outer circumferential face of the holding portion; and a fixed portion fixing to an attached member (for example, a panel) such as the panel and the like, are connected. In the clamp, the fixed portion is fixed to the attached member (for example, the panel), so that the long object (for example, the pipe) is attached to the attached member (for example, the panel). A vibration-absorption portion for reducing a transmission of a vibration provides support between the holding portion and the main body portion. The holding portion, the main body portion, and the vibration-absorption portion are made from the same resin material.

7 Claims, 15 Drawing Sheets

(51) Int. Cl.
*F16L 3/13* (2006.01)
*F16L 55/035* (2006.01)
*B60R 16/02* (2006.01)
*F16B 21/08* (2006.01)

(56) References Cited

U.S. PATENT DOCUMENTS

| | | | |
|---|---|---|---|
| 5,947,426 A * | 9/1999 | Kraus | 248/74.2 |
| 6,371,419 B1 * | 4/2002 | Ohnuki | 248/74.2 |
| 6,915,990 B2 * | 7/2005 | Maruyama | 248/68.1 |
| 7,011,277 B2 * | 3/2006 | Mizukoshi et al. | 248/68.1 |
| 7,036,775 B2 * | 5/2006 | Nakanishi | 248/68.1 |
| 7,328,873 B2 * | 2/2008 | Suzuki et al. | 248/68.1 |
| 2004/0113027 A1 | 6/2004 | Nakanishi | |
| 2005/0284989 A1 | 12/2005 | Mizukoshi | |
| 2007/0215757 A1 * | 9/2007 | Yuta | 248/68.1 |
| 2013/0146720 A1 * | 6/2013 | Meyers et al. | 248/68.1 |

FOREIGN PATENT DOCUMENTS

| | | |
|---|---|---|
| EP | 0838626 A2 | 4/1998 |
| JP | 11-013942 A | 1/1999 |
| JP | H11-336717 A | 12/1999 |
| JP | 2002-238134 A | 8/2002 |
| JP | 2005-188578 A | 7/2005 |
| JP | 2010-096332 A | 4/2010 |

OTHER PUBLICATIONS

Europe Patent Office, "Search Report for EP11832633.9," Aug. 5, 2014.

* cited by examiner

CLAMP

FIELD OF TECHNOLOGY

The present invention relates to a clamp including an anti-vibration function capable of reducing a transmission of a vibration between a long object such as a pipe and the like, and an attached member such as a panel and the like. The present invention can reduce the transmission of the vibration, and can be integrally molded using the same resin material.

BACKGROUND ART

Conventionally, there is known a clamp provided with a grip portion, holding the long object such as the pipe and the like, in one end portion of a circular flange; and a fixed portion, fixing to the attached member such as the panel and the like, in the other end portion of the flange (see paragraphs [0016] and [0017], and FIG. 1 of Patent Document 1).

Between the aforementioned conventional flange and grip portion, there are provided two pieces of curved arms, and by the curved arms, the transmission of the vibration is damped (see paragraph [0018], FIG. 1, FIG. 7, and FIG. 8 of the Patent Document 1).

PRIOR ART DOCUMENT

Patent Document

Patent Document 1: Japanese Patent Application Publication No. 2005-188578

SUMMARY OF THE INVENTION

Problems to be Solved by the Invention

The aforementioned conventional clamp, however, had a problem that although there had been an effect for absorption of the vibration in a circumferential direction relative to the pipe, and the vibration in an axial direction of the pipe, the conventional clamp was not suitable for the absorption of the vibration in a twisting direction of the pipe.

Therefore, the present invention is made in view of the aforementioned problem that a conventional technology has, and an object of the present invention is to be capable of reducing the transmission of the vibration, and to be capable of being integrally molded using the same resin material.

Means for Solving the Problems

The present invention is made in order to obtain the aforementioned object, and the present invention has the following characteristics.

First, in the clamp, the following configurations are connected.

(1) Holding Portion

A holding portion, provided with an opening for inserting a long object (for example, a pipe) such as the pipe and the like, is for holding the long object (for example, the pipe).

(2) Main Body Portion

A main body portion is disposed leaving a certain space on an outer circumferential face of the holding portion.

(3) Fixed Portion

A fixed portion is fixed to an attached member (for example, a panel) such as the panel and the like from the main body portion.

Secondly, in the clamp, the fixed portion is fixed to the attached member (for example, the panel), so that the long object (for example, the pipe) is attached to the attached member (for example, the panel).

Thirdly, a vibration-absorption portion for reducing a transmission of a vibration provides support between the holding portion and the main body portion.

Fourthly, the holding portion, the main body portion, and the vibration-absorption portion are made from the same resin material.

The present invention may have the following characteristic.

Namely, the vibration-absorption portion turnably bends in an intersecting direction intersecting relative to an axial direction of the long object (for example, the pipe). In the embodiment, the vibration-absorption portion turnably bends so as to be capable of reducing the transmission of the vibration in all directions.

The present invention may have the following characteristic.

First, the vibration-absorption portion is composed of a plurality of resin springs (for example, first and second resin springs) formed in a plate shape.

Secondly, one end portion of the resin spring (for example, the first and second resin springs) is provided to connect to the holding portion. Also, in the holding portion, one end portion of the resin spring is positioned in one end portion of the long object (for example, the pipe) in the axial direction.

Thirdly, the other end portion of the resin spring (for example, the first and second resin springs) is provided to extend in the axial direction of the long object (for example, the pipe), and is provided to connect to the main body portion. Also, in the main body portion, the other end portion of the resin spring is positioned in an end portion which is on an opposite side to the one end portion in the axial direction of the long object (for example, the pipe).

In the embodiment, since the resin spring formed in the plate shape is used, a restoring force is high so as to be capable of converging the vibration at an early point.

Namely, a plurality of the resin springs formed in the plate shape is provided to extend in the axial direction of the long object so as to be capable of reducing the transmission of the vibration in all directions by the resin springs.

The present invention may have the following characteristic.

First, in one adjacent resin spring (for example, the first resin spring) among a plurality of the resin springs (for example, the first and second resin springs), one end portion is provided to connect to the holding portion, and is positioned in one end portion in the holding portion. The other end portion is provided to extend in the axial direction of the long object (for example, the pipe), and is provided to connect to the main body portion. Also, the other end portion is positioned in an end portion on an opposite side in the main body portion.

Secondly, in the other adjacent resin spring (for example, the second resin spring), one end portion is provided to connect to the holding portion, and is positioned in an end portion on an opposite side in the holding portion. The other end portion is provided to extend in the axial direction of the long object (for example, the pipe), and is provided to connect to the main body portion. Also, the other end portion is positioned in one end portion in the main body portion.

In the embodiment, the resin springs are alternately provided in an intersecting manner so as to be capable of easily twisting the vibration-absorption portion in a forward-and-reverse direction.

The present invention may have the following characteristic.

Namely, in the holding portion and the main body portion, except for being connected at the vibration-absorption portion, the holding portion and the main body portion are separated. In the embodiment, since the holding portion and the main body portion are separated except for being connected at the vibration-absorption portion, the transmission of the vibration in all directions can be effectively reduced by the vibration-absorption portion.

The present invention may have the following characteristic.

Namely, the holding portion and the main body portion have the following configuration.

(1) Projecting Portion

A projecting portion is provided in either (for example, the main body portion) the holding portion or the main body portion so that the holding portion does not drop out of the main body portion when the vibration-absorption portion is broken, and the projecting portion extends toward the other member (for example, the holding portion).

(2) Hole Portion

A hole portion is provided in the other member (for example, the holding portion), and admits the projecting portion.

In the embodiment, when the vibration-absorption portion is broken, a dropout of the holding portion from the main body portion can be prevented.

The present invention may have the following characteristic.

Namely, the vibration-absorption portion is formed at least with three pieces or more, and adjacent vibration-absorption portions are disposed to have an equal angle formed relative to the center of the holding portion, or are disposed to have an equal distance between the adjacent vibration-absorption portions.

In the embodiment, the vibration can be absorbed not only in a longitudinal direction, but also in a crosswise direction so as to be capable of reducing an effect due to an attachment direction of the clamp.

Effect of the Invention

The present invention is configured as mentioned above, so that the transmission of the vibration can be reduced, and the clamp can be integrally molded using the same resin material. Also, the clamp, which has resistance to the vibration in all directions, especially also in a twisting direction of the long object, can be provided.

BEST MODES OF CARRYING OUT THE INVENTION (First Embodiment)

With FIGS. 1 to 10, the first embodiment of the present invention will be explained.

Figure 3:
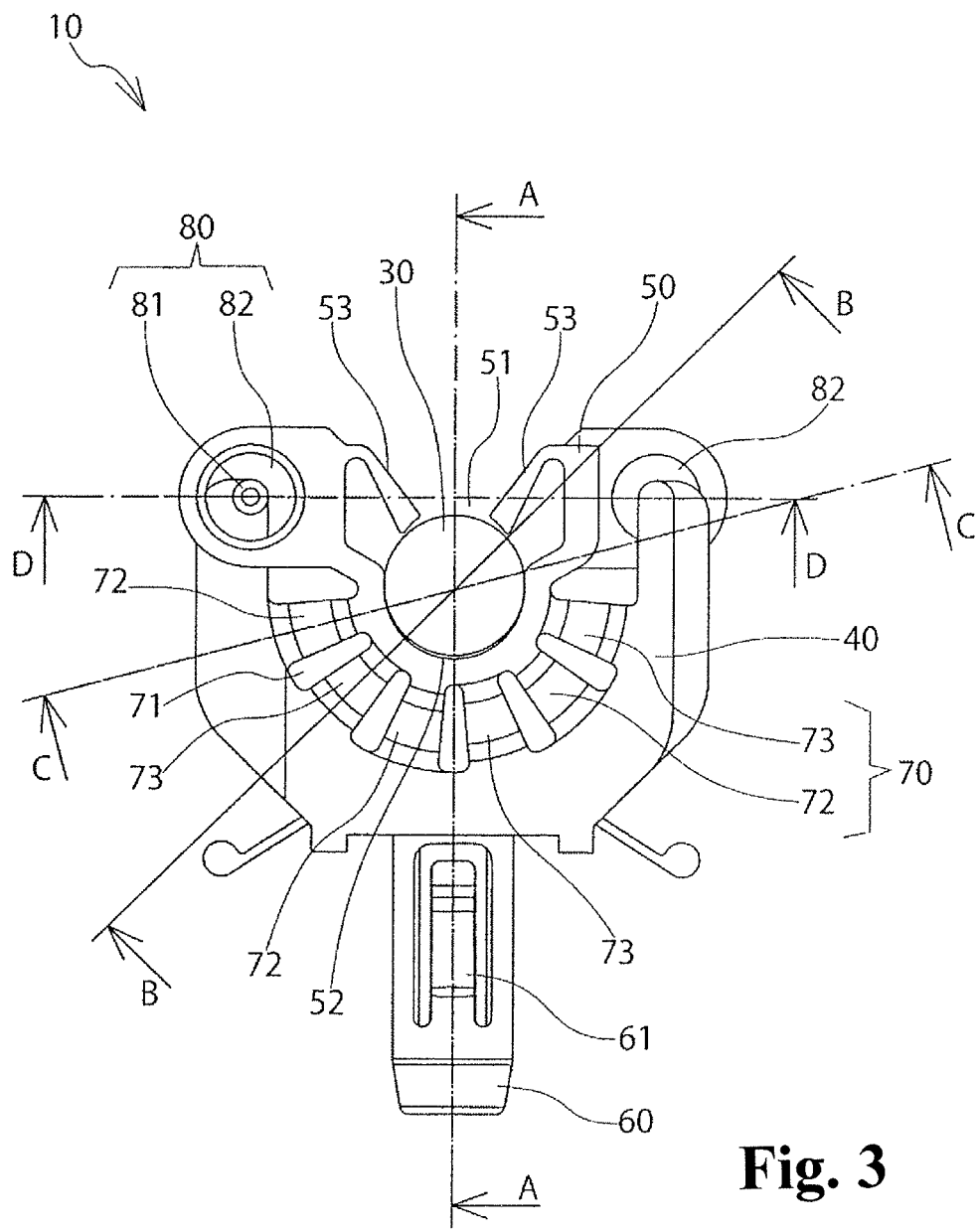
FIG. 3 is a front view of the clamp.
Figure 4:
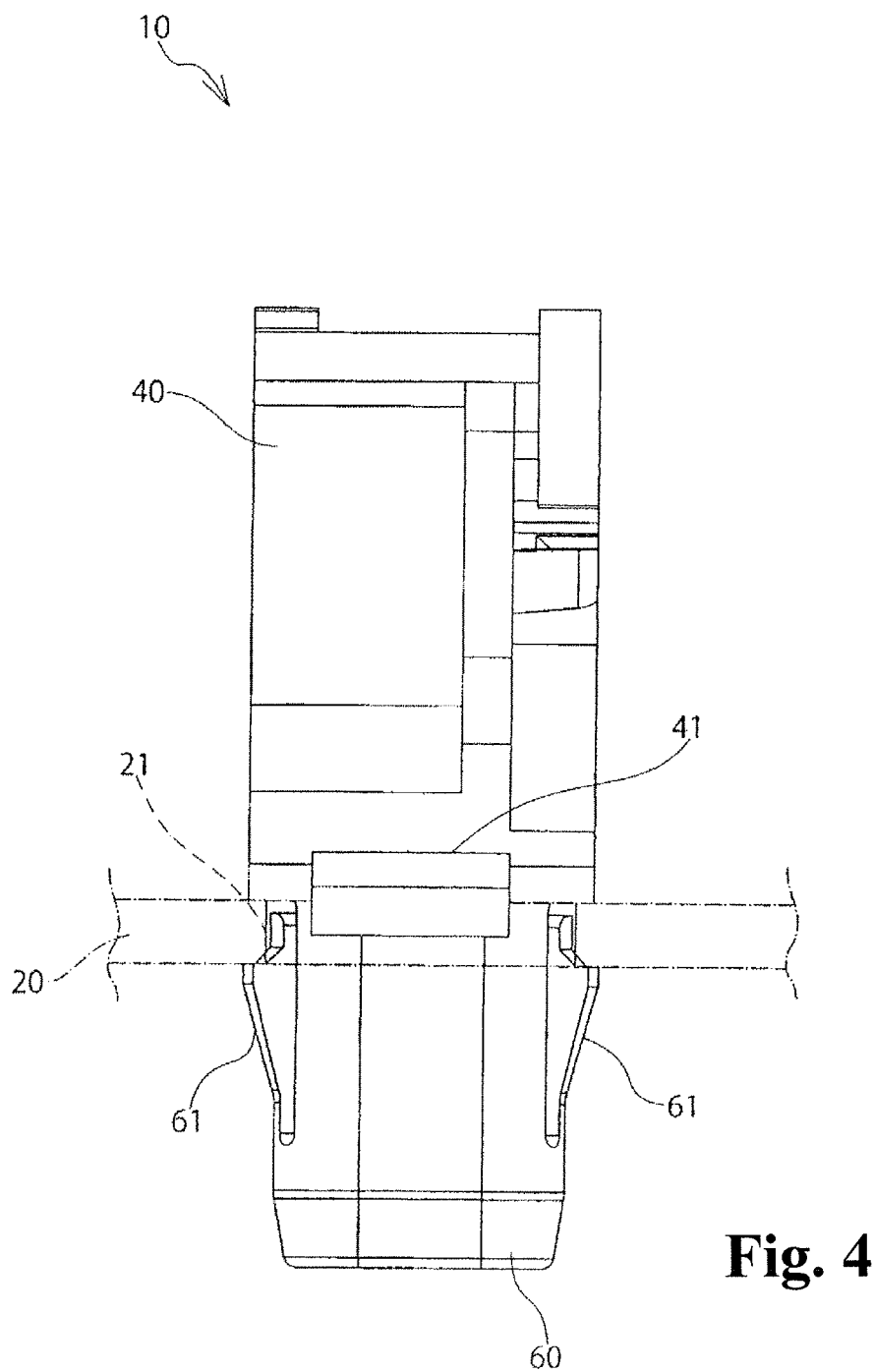
FIG. 4 is a side view of the clamp.
Figure 5:
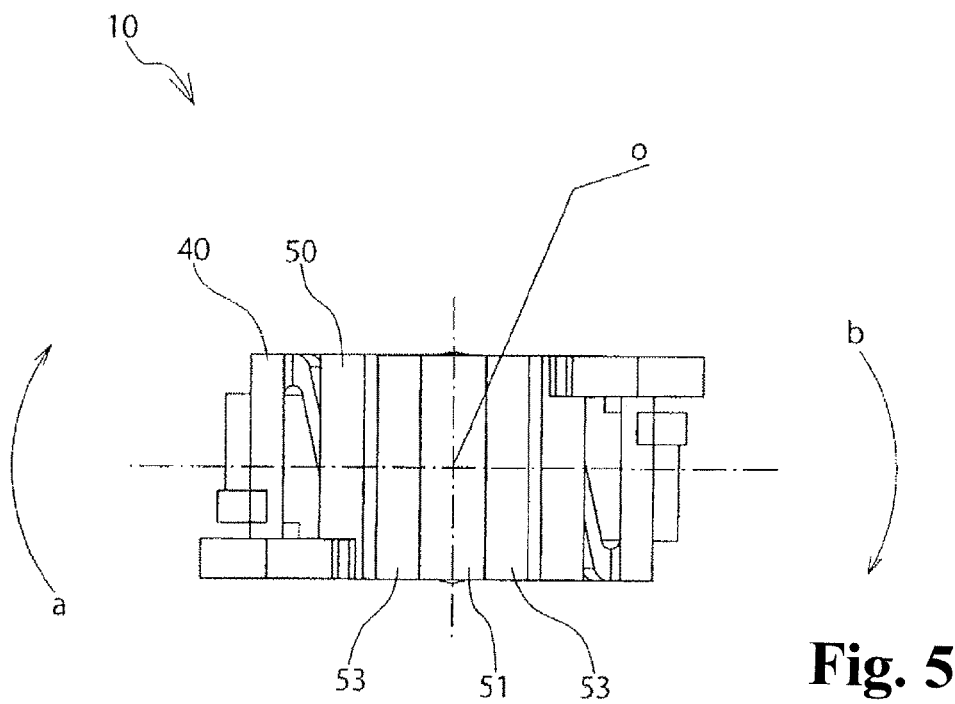
FIG. 5 is a plan view of the clamp.
Figure 6:
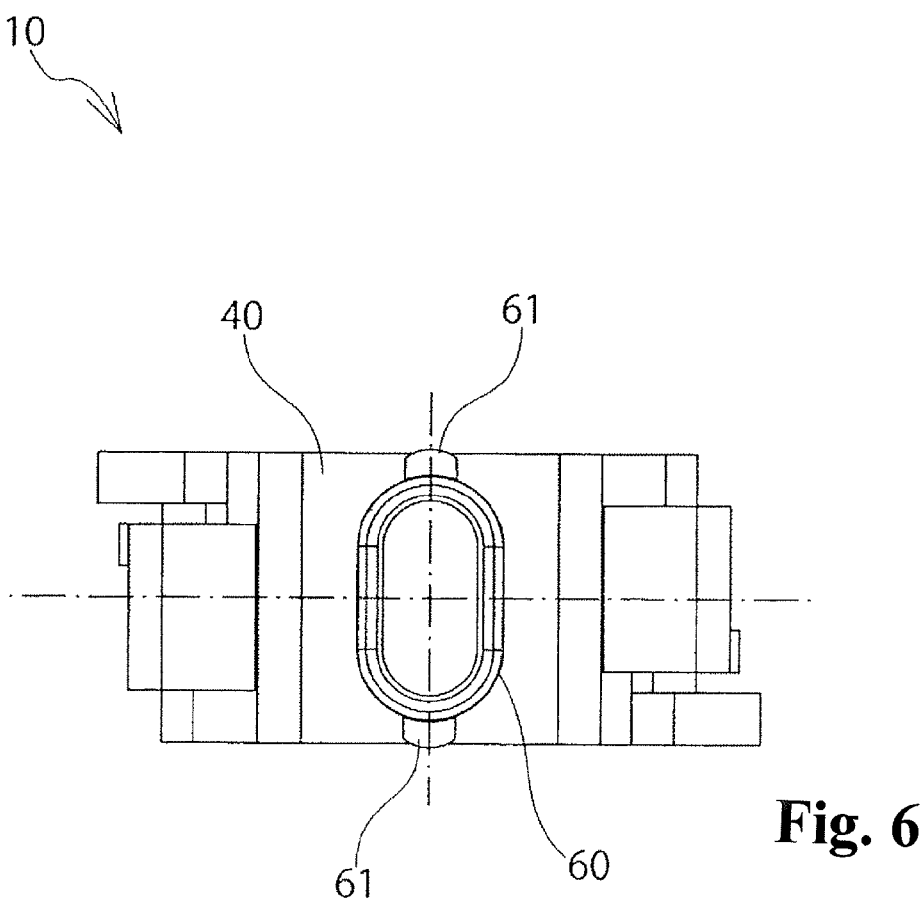
FIG. 6 is a bottom view of the clamp.

In the figures, the reference numeral 10 represents a clamp, and as shown in FIGS. 3 and 4, the clamp 10 is fixed to, for example, a panel 20 (an attached member) such as a body and the like inside an engine compartment (not shown in the figures) of an automobile, and is used for holding a pipe 30 (a long object) such as plumbing for an air conditioner and the like.

As shown in FIG. 4, in the panel 20, there is formed an attachment hole 21 in which the later-mentioned fixed portion 60 of the clamp 10 can be inserted. The attachment hole 21 passes through front and reverse faces of the panel 20, and is formed in an oval shape fitted into an external shape of the later-mentioned fixed portion 60.

Incidentally, as for a shape of the attachment hole 21, although the oval shape is illustrated as an example, the shape is not limited to that, and may be formed in a non-circular shape such as a rectangular shape, or a circular shape.

Also, as for the attached member, although the panel 20 is illustrated as an example, the attached member is not limited to that. Also, as for the panel 20, although the body of the automobile is illustrated as an example, the panel 20 is not limited to the body, nor limited to the automobile. As for the long object, although the pipe 30 is illustrated as an example, the long object is not limited to a hollow object, and may be a solid object such as a cable and the like. As for the pipe 30, although the plumbing for the air conditioner is illustrated as an example, the pipe 30 is not limited to the plumbing, or limited to the air conditioner.

Figure 1:
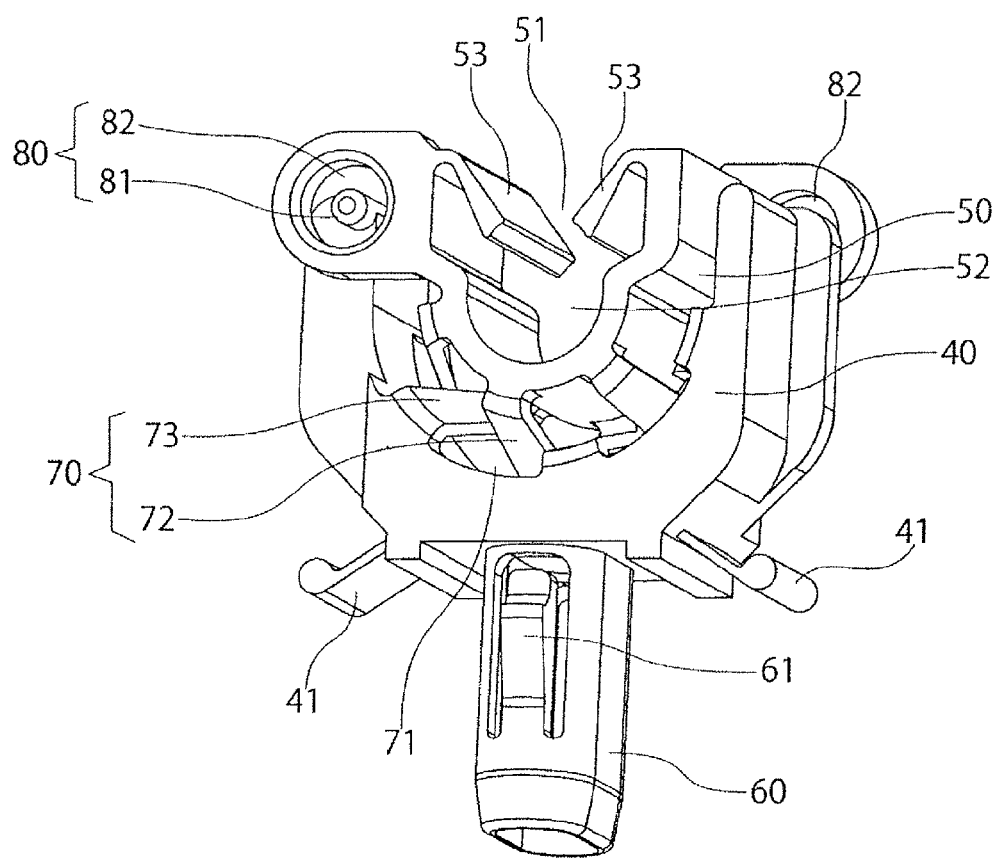
FIG. 1 shows the first embodiment of the present invention, and is a perspective view of a clamp.
Figure 2:
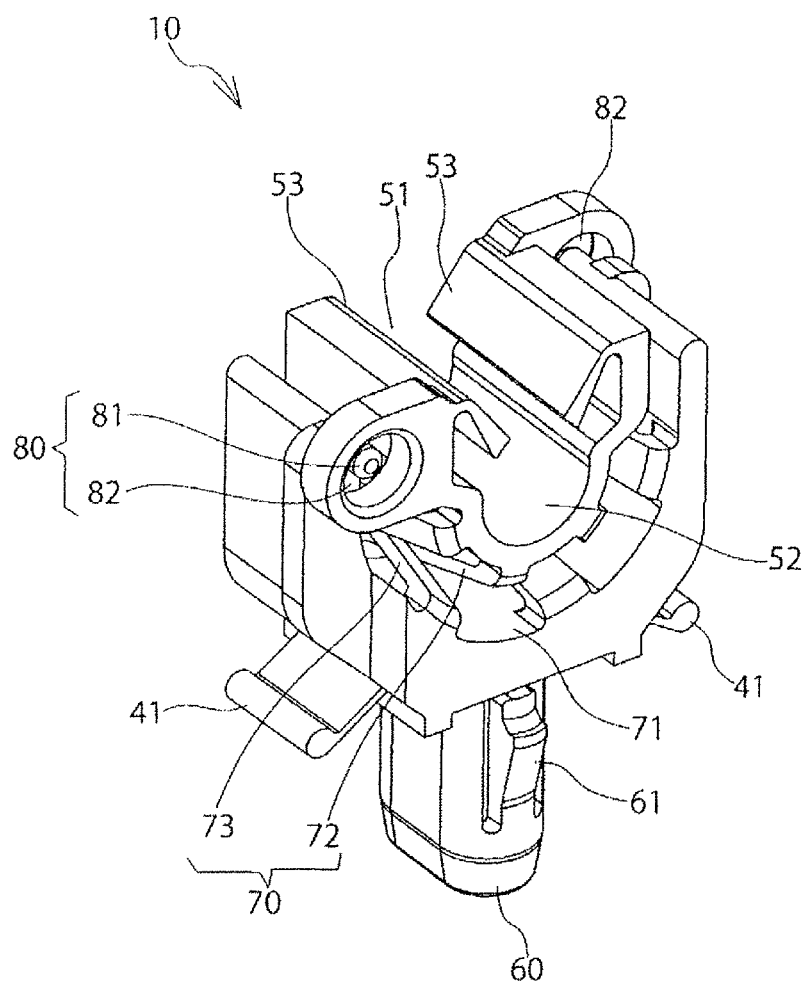
FIG. 2 is the other perspective view of the clamp.

As shown in FIGS. 1 to 3, the clamp 10 roughly comprises the following respective portions, and is integrally molded in thermoplastic synthetic resin having an appropriate amount of elasticity and rigidity.

Incidentally, the following (1) to (5) will be described later.

(1) Main body portion 40
(2) Holding portion 50
(3) Fixed portion 60
(4) Vibration-absorption portions 70
(5) Dropout-prevention portions 80

Incidentally, each portion of the clamp 10 is not limited to the aforementioned (1) to (5).

(Main Body Portion 40)

As shown in FIGS. 1 to 3, the main body portion 40 is connected to the later-mentioned holding portion 50, and is disposed leaving a certain space 71 on an outer circumferential face of the holding portion 50.

The main body portion 40 is formed in a C shape or U shape, whose upper face is open. The space 71 is formed in a C shape or U shape, whose upper face is open, along an inner circumference of the main body portion 40.

Incidentally, as for a shape of the main body portion 40 or the space 71, although the C shape or U shape is illustrated as an example, the shape is not limited to those, and may be formed in an angular channel shape, V shape, or L shape.

As shown in FIGS. 1 to 3, the main body portion 40 comprises the following portion.

Incidentally, the portion of the main body portion 40 is not limited to the following (1).

(1) Elastic Pieces 41

As shown in FIGS. 1 to 3, elastic pieces 41 extend obliquely downward from an outer circumference of the main body portion 40, and elastically abut against a surface of the panel 20. The elastic pieces 41 sandwich the later-mentioned fixed portion 60, and are formed as a pair on both sides thereof.

(Holding Portion 50)

As shown in FIGS. 1 to 3, the holding portion 50 is connected to the main body portion 40; is provided with an opening 51 for inserting the pipe 30 (the long object); and holds the pipe 30.

The holding portion 50 is disposed leaving the space 71 on an inner circumferential side of the main body portion 40; is one size smaller than the main body portion 40; includes the opening 51 on an upper face; and is formed in the C shape or U shape.

Incidentally, as for the shape of the holding portion 50, although the C shape or U shape is illustrated as an example, the shape is not limited to those, and may be formed in the angular channel shape, V shape, or L shape.

As shown in FIGS. 1 to 3, the holding portion 50 comprises the following respective portions.

Incidentally, each portion of the holding portion 50 is not limited to the following (1) to (3).

(1) Opening 51

As shown in FIGS. 1 to 3, the opening 51 is positioned inside an interval of opposed upper end portions of the holding portion 50, and an opening width is set in a diameter of the pipe 30 or above.

(2) Housing Space 52

As shown in FIGS. 1 to 3, a housing space 52 is communicated with the opening 51, and is formed on an inner circumferential side of the holding portion 50, and the pipe 30 is fitted into the housing space 52. A diameter of the housing space 52 is set in the diameter of the pipe 30 or above, and front and back faces positioned in an axial direction of the pipe 30 are open.

(3) Holding Pieces 53

As shown in FIGS. 1 to 3, holding pieces 53 are positioned in the opening 51, and hold the pipe 30 fitted into the housing space 52 into the housing space 52. In the holding pieces 53, both opposed end portions of the holding portion 50, which face the opening 51, are positioned as a pair, and the holding pieces 53 are formed by folding back each end portion in approximately a V shape toward the housing space 52. A pair of the holding pieces 53 is formed in approximately the V shape in such a way as to gradually narrow the opening width of the opening 51 toward a back of the housing space 52. A pair of the holding pieces 53 slopes opposed lateral faces obliquely downward to the back of the housing space 52 by sandwiching the opening 51.

(Fixed Portion 60)

As shown in FIGS. 1 to 4, and 6, the fixed portion 60 is connected to the main body portion 40, and is fixed to the panel 20 (the attached member).

The fixed portion 60 is formed in, i.e., a box and anchor type. The fixed portion 60 has a flat surface of an oval shape, and is formed in a hollow cylinder shape. The fixed portion 60 is inserted into the attachment hole 21 of the panel 20.

As shown in FIGS. 1 to 4, and 6, the fixed portion 60 comprises the following portion.

Incidentally, each portion of the fixed portion 60 is not limited to the following (1).

(1) Claw Portions 61

As shown in FIGS. 1 to 4, and 6, a pair of claw portions 61 protrudes back-to-back from an outside surface of the fixed portion 60, and when the fixed portion 60 is inserted into the attachment hole 21 from a surface side of the panel 20, the claw portions 61 are pressed by an inner edge of the attachment hole 21, and are bent into a hollow inside of the fixed portion 60. After the claw portions 61 pass through the attachment hole 21, the claw portions 61 restore to its original state by an elastic restoring force of resin at a reverse face side of the panel 20, and sandwich the panel 20 from the front and reverse faces of the panel 20 between the main body portion 40. The claw portions 61 are formed by notching an outer wall of the fixed portion 60 in approximately a C shape, and are positioned by being separated for a distance approximately equal to a plate thickness of the panel 20 from a lower face of the main body portion 40.

(Vibration-Absorption Portions 70)

As shown in FIGS. 1 to 4, and 7 to 9, the vibration-absorption portions 70 are positioned between the holding portion 50 and the main body portion 40, and reduce a transmission of a vibration.

The vibration-absorption portions 70 turnably bend in an intersecting direction intersecting relative to the axial direction of the pipe 30 (the long object).

The vibration-absorption portions 70 are composed of a plurality of resin springs, for example, first and second resin springs 72 and 73, formed in a plate shape.

Incidentally, as for the vibration-absorption portions 70, although two kinds of the first and second resin springs 72 and are illustrated as an example, the vibration-absorption portions 70 are not limited to those, and may be one kind, or three kinds or more.

As shown in FIG. 3, the first and second resin springs 72 and 73 are disposed inside the space 71 formed between the main body portion 40 and the holding portion 50. The first and second resin springs 72 and 73 are alternately disposed in a circumferential direction of the space 71 having the C shape or U shape whose upper face is open, and are positioned to be mutually separated. The first resin spring 72 and the second resin spring 73 are provided with three pieces each and a total of six pieces.

Incidentally, although the first resin spring 72 and the second resin spring 73 are alternately provided, the first resin spring 72 and the second resin spring 73 are not limited to the above. Also, a total piece number of the first and second resin springs 72 and 73 is not limited to six pieces. However, when the first resin spring 72 and the second resin spring 73 are disposed in such a way as to have a pair, even if one resin spring of a pair is pulled, the other resin spring resists so as to be capable of allowing a twist or a movement of the holding portion due to the vibration by the resin springs of a pair.

(First Resin Spring 72)

Figure 7:
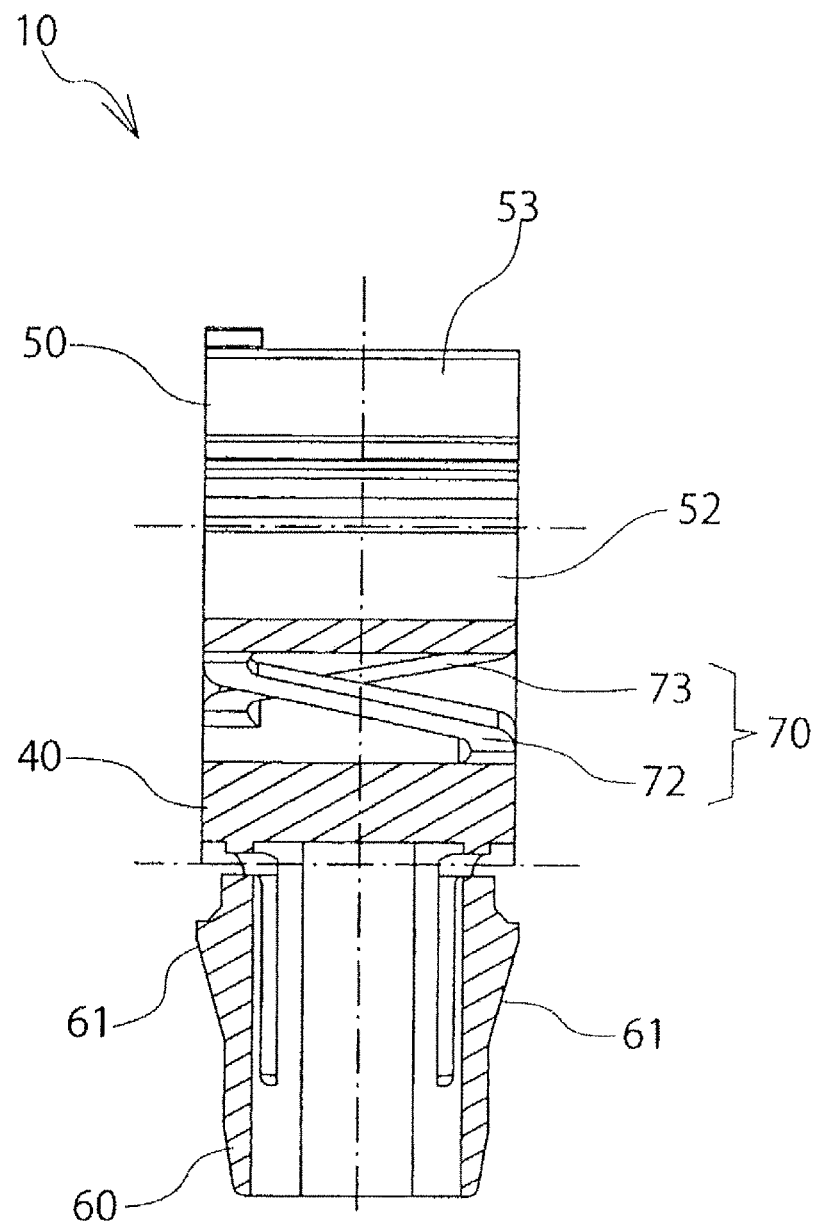
FIG. 7 is a cross-sectional view taken along a line A-A in FIG. 3.
Figure 8:
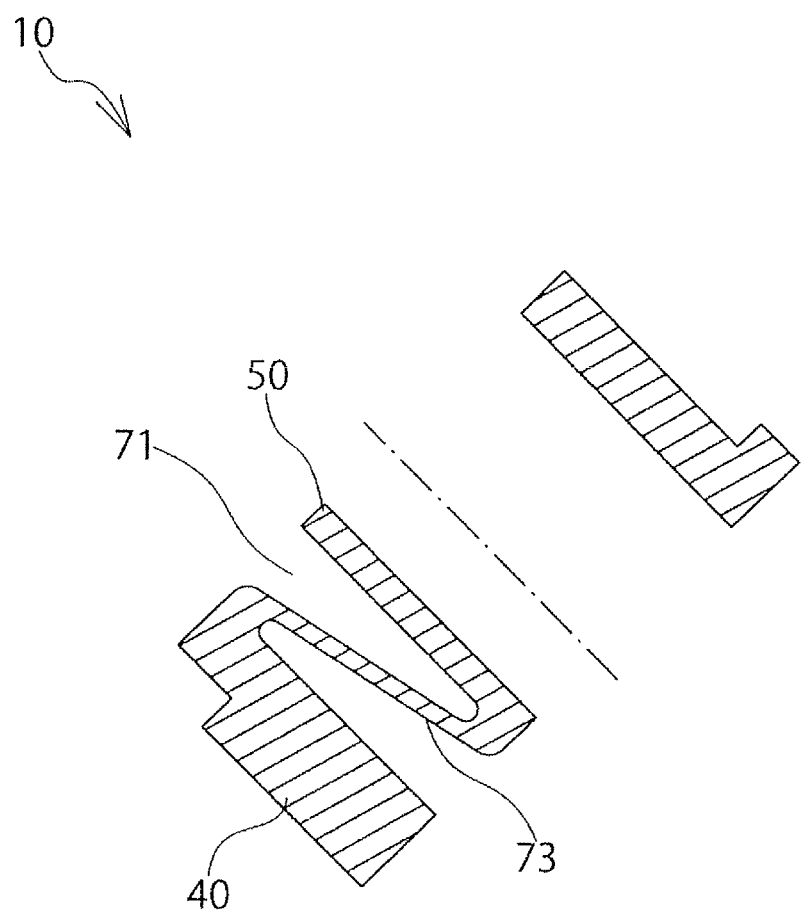
FIG. 8 is a cross-sectional view taken along a line B-B in FIG. 3.
Figure 9:
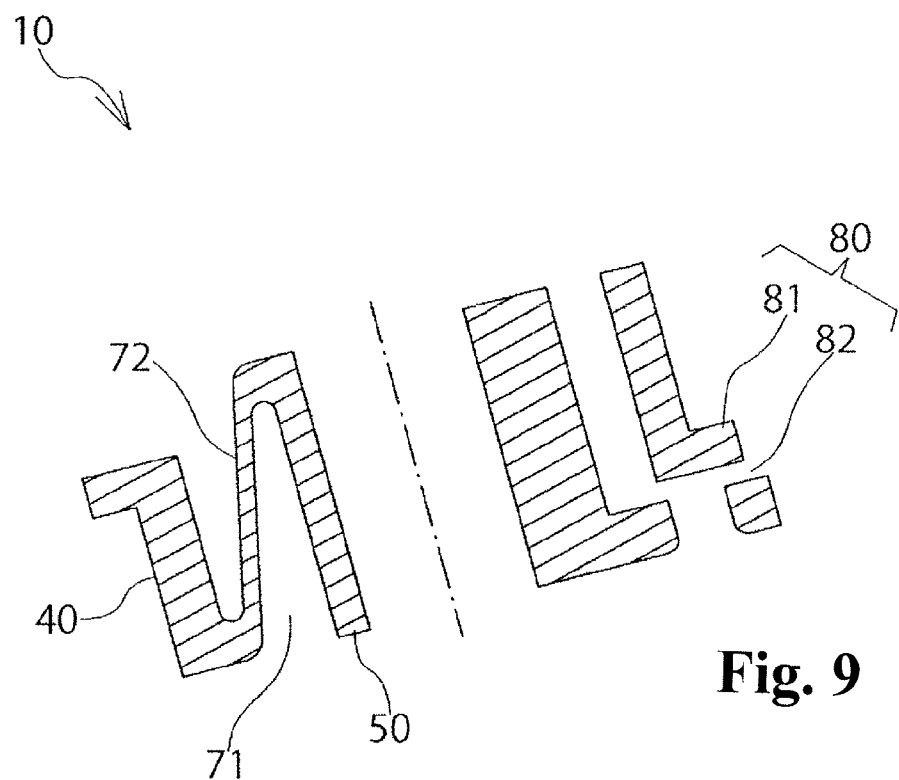
FIG. 9 is a cross-sectional view taken along a line C-C in FIG. 3.

The first resin spring 72 is positioned on a near side in FIG. 7, and the second resin spring 73 is positioned on a back side. When the first resin spring 72 and the second resin spring 73 are viewed from a lateral side, the first resin spring 72 and the second resin spring 73 are disposed in such a way as to intersect in an X shape.

As shown in FIGS. 1 to 3, 7, and 9, in the first resin spring 72, one end portion (positioned on a left side in FIG. 7, for example, an upper end portion) is provided to connect to the outer circumferential face of the holding portion 50. Also, one end portion of the first resin spring 72 is positioned in one end portion (for example, an end portion on the left side) in the holding portion 50.

The other end portion (positioned on a right side in FIG. 7, for example, a lower end portion) of the first resin spring 72 is provided to extend in the axial direction of the pipe 30 (the long object), and is provided to connect to an inner circumferential face of the main body portion 40. Also, the other end portion of the first resin spring 72 is positioned in an end portion (for example, an end portion on the right side) on an opposite side in the main body portion 40.

(Second Resin Spring 73)

The second resin spring 73 is positioned on the back side of the first resin spring 72 in FIG. 7. As shown in FIGS. 1 to 3, 7, and 8, in the second resin spring 73, one end portion (positioned on the right side in FIG. 7, for example, the upper end portion) is provided to connect to the outer circumferential face of the holding portion 50. Also, one end portion of the second resin spring 73 is positioned in the end portion (for example, the end portion on the right side) on the opposite side in the holding portion 50.

The other end portion (positioned on the right side in FIG. 7, for example, the lower end portion) of the second resin spring 73 is provided to extend in the axial direction of the pipe 30 (the long object), and is provided to connect to the inner circumferential face of the main body portion 40. Also, the other end portion of the second resin spring 73 is positioned in one end portion (for example, the end portion on the left side) in the main body portion 40.

(Dropout-prevention Portions 80)

As shown in FIGS. 1 to 3, and 10, the dropout-prevention portions 80 are for preventing the holding portion 50 from dropping out of the main body portion 40 when the vibration-absorption portions 70 are broken.

As shown in FIGS. 1 to 3, and 10, the dropout-prevention portions 80 roughly comprise the following respective portions.

Incidentally, each portion of the dropout-prevention portions 80 is not limited to the following (1) and (2).

(1) Projecting Portions 81

As shown in FIGS. 1 to 3, and 10, projecting portions 81 are provided in either the holding portion 50 or the main body portion 40, for example, in the main body portion 40 so that the holding portion 50 does not drop out of the main body portion 40 when the vibration-absorption portions 70 are broken. Also, the projecting portions 81 extend toward the other member, for example, the holding portion 50.

The projecting portions 81 are formed in a column shape, and are respectively provided on both end portions of the main body portion 40, i.e., in right-and-left upper end portions facing each other by sandwiching the space 71 with a total of two pieces.

Figure 10:
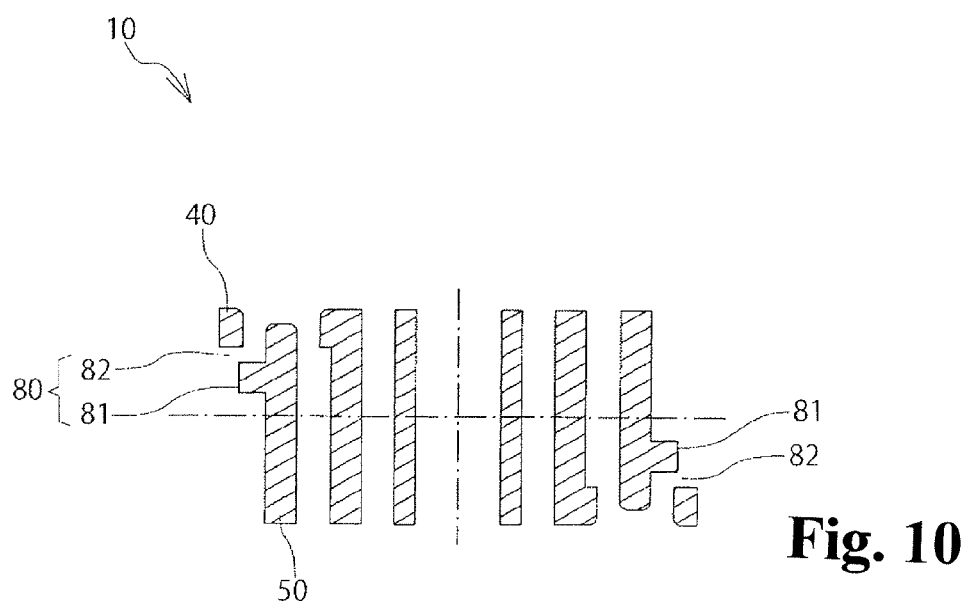
FIG. 10 is a cross-sectional view taken along a line D-D in FIG. 3.

Two projecting portions 81 extend sideways along an axis line direction of the pipe 30 (the long object) in FIG. 3, and as shown in FIG. 10, the projecting portions 81 extend toward an outside mutually back-to-back.

(2) Hole Portions 82

As shown in FIGS. 1 to 3, and 10, hole portions 82 are provided in the other member, for example, the holding portion 50, and receive the projecting portions 81.

The hole portions 82 are formed in a circular shape having an inner diameter larger than an outer diameter of the projecting portions 81. The hole portions 82 are respectively provided on both end portions of the holding portion 50, i.e., on the right-and-left upper end portions facing each other by sandwiching the opening 51, with the same number of the projecting portions 81, a total of two pieces.

As shown in FIGS. 1 to 3, and 10, the two projecting portions 81 are individually fitted into the two hole portions 82. An outer circumference of the projecting portion 81 and an inner circumference of the hole portion 82 are positioned to be mutually separated, and do not contact to each other. In the present embodiment, by conforming an axis core of the projecting portion 81 to the center of the hole portion 82, there is formed an annular gap between the outer circumference of the projecting portion 81 and the inner circumference of the hole portion 82. Consequently, in the dropout-prevention portions 80, there is no transmission of the vibration between the main body portion 40 and the holding portion 50.

(Usage Method of Clamp 10)

Next, a usage method of the clamp 10 having the aforementioned configuration will be explained.

First, as shown in FIG. 4, the fixed portion 60 is fixed to the panel 20 (the attached member). After that, as shown in FIG. 3, the pipe 30 (the long object) is mounted in the holding portion 50 so as to plumb the pipe 30 along the panel 20 through the clamp 10.

Incidentally, although the fixed portion 60 is fixed to the panel 20 beforehand, vice versa, the pipe 30 may be mounted beforehand, and then the fixed portion 60 may be fixed to the panel 20.

As shown in FIG. 4, in order to be fixed to the panel 20, the fixed portion 60 of the clamp 10 is inserted from the surface side of the panel 20 by conforming to the attachment hole 21 of the panel 20.

When the fixed portion 60 is inserted, the claw portions 61 are bent in by being pressed by the inner edge of the attachment hole 21. After the claw portions 61 pass through the attachment hole 21, the claw portions 61 restore to its original state by the elastic restoring force of the resin at the reverse face side of the panel 20, and sandwich the panel 20 from the front and reverse faces between the main body portion 40 as shown in FIG. 4. Accordingly, the clamp 10 is fixed to the attachment hole 21.

At that time, as shown in FIG. 4, a pair of the elastic pieces 41 of the main body portion 40 elastically abuts against the surface of the panel 20, so that a variation of the plate thickness of the panel 20 can be absorbed so as to be capable of preventing attachment wobbling of the clamp 10.

Next, as shown in FIG. 3, the pipe 30 is inserted by conforming to the opening 51 of the holding portion 50. When the pipe 30 is inserted, an outer circumference thereof abuts against the holding pieces 53.

When the pipe 30 is inserted further, the outer circumference of the pipe 30 is guided by inclined faces of the holding pieces 53, and the pipe 30 moves toward the housing space 52.

An opposed interval of a pair of opposed holding pieces 53 is gradually narrowed so as to press a pair of the holding pieces 53 in a direction of being mutually separated by the outer circumference of the pipe 30. Consequently, the holding pieces 53 bend in the direction of being mutually separated, so that the opposed interval of a pair of the holding pieces 53 expands, and the pipe 30 passes through the opposed interval, and is fitted into the housing space 52.

At that time, when the pipe 30 is fitted into the housing space 52, a pair of the holding pieces 53 restores to its original state by a restoring force of the resin. Accordingly, as shown in FIG. 3, the opposed interval of a pair of the holding pieces 53 is narrowed, so that the pipe 30 cannot drop out of the housing space 52.

Also, as shown in FIG. 3, end portions, which are free end portions of a pair of the holding pieces 53, face the outer circumference of the pipe 30 inside the housing space 52. Consequently, when a force in a direction dropping out of the opening 51 acts on the pipe 30, the end portions of a pair of the holding pieces 53 abut against the outer circumference of the pipe 30 so as to prevent the pipe 30 from dropping out.

(Movement of Vibration-absorption Portions 70)

Next, a movement of the vibration-absorption portions 70 will be explained.

According to the vibration-absorption portions 70 of the present embodiment, vibrations in all directions transmitted to the clamp 10 through the pipe 30 can be absorbed and damped, and the vibration transmitted to the panel 20 from the pipe 30 can be reduced.

Also, the vibration-absorption portions 70 are configured by the first and second resin springs 72 and 73 formed in the plate shape so as to have a high restoring force, and to be capable of converging the vibration at an early point.

Incidentally, the vibration transmitted to the clamp 10 is not limited to the vibration transmitted from the pipe 30, and the vibrations in all directions transmitted to the clamp 10 from the panel 20 can also be absorbed and damped, and the vibration transmitted to the pipe 30 from the panel 20 can also be reduced.

An external force transmitted to the pipe 30 can be resolved into the following vibrations.

Although it is not shown in the figures, the vibration of the air conditioner, the vibration of an engine, the vibration at a driving time, and the like, become a factor for the external force.

Incidentally, the following (1) to (3) will be described later.
(1) Vibration in twisting direction
(2) Vibration in direction orthogonal to circumferential direction of pipe 30
(3) Vibration in axial direction of pipe 30

Incidentally, the external force transmitted to the pipe 30 is not limited to the following (1) to (3), and may be a combination of those.

(Vibration in Twisting Direction)

The vibration in a twisting direction is transmitted to the holding portion 50 of the clamp 10 through the pipe 30, the fixed portion 60 is fixed to the panel 20, and the main body portion 40 is integrally connected relative to the fixed portion 60. Accordingly, relative to the fixed portion 60 and the main body portion 40, the vibration in the twisting direction acts as the vibration attempting to rotate the holding portion 50 in a forward-and-reverse direction (arrows a and b) with a central focus on a virtual center point O of the clamp 10 in FIG. 5.

On the other hand, a plurality of the first and second resin springs 72 and 73 in a comparatively thin plate shape elastically bends in such a way as to be twisted so as to allow the holding portion 50 to move in the twisting direction, and to be capable of preventing a breakage of the clamp 10.

The bended first and second resin springs 72 and 73 restore to its original state by the elastic restoring force of the resin, and bending and restoring are repeated. At that time, generally, the resin spring has a low degree of elasticity compared to a metal spring so as to have a high damping performance, and to have a function as a damper as well.

As a result, the vibration in the twisting direction relative to the pipe 30 can be absorbed and damped by the vibration-absorption portions 70, and the transmission of the vibration into the panel 20 can be reduced.

(Vibration in Direction Orthogonal to Circumferential Direction of Pipe 30)

The vibration in a direction orthogonal to a circumferential direction of the pipe 30 is transmitted to the holding portion 50 through the pipe 30, and in FIG. 3, the holding portion 50 acts as, for example, the vibration attempting to move up and down relative to the fixed portion 60 and the main body portion 40.

On the other hand, as shown in FIG. 7, when the first resin spring 72 and the second resin spring 73 are viewed from the lateral side, the first resin spring 72 and the second resin spring 73 are disposed in such a way as to intersect in the X shape, so that the first resin spring 72 and the second resin spring 73 expand and shrink in an up-and-down direction, i.e., in a pantograph shape, and repeatedly expand and shrink in the up-and-down direction.

As a result, the vibration in the up-and-down direction relative to the pipe 30 can be absorbed and damped by the vibration-absorption portions 70, and the transmission of the vibration into the panel 20 can be reduced.

(Vibration in Axial Direction of Pipe 30)

The vibration in the axial direction of the pipe 30 is transmitted to the holding portion 50 through the pipe 30, and in FIG. 4, the vibration in the axial direction of the pipe 30 acts as the vibration attempting to tilt the holding portion 50, for example, in a right-and-left direction relative to the fixed portion 60 and the main body portion 40.

On the other hand, as shown in FIG. 7, when the first resin spring 72 and the second resin spring 73 are viewed from the lateral side, the first resin spring 72 and the second resin spring 73 are disposed in such a way as to intersect in the X shape, so that the first resin spring 72 and the second resin spring 73 expand and shrinkin the up-and-down direction, i.e., in the pantograph shape, and repeatedly expand and shrink in the up-and-down direction.

As a result, the vibration in the right-and-left direction relative to the pipe 30 can be absorbed and damped by the vibration-absorption portions 70, and the transmission of the vibration into the panel 20 can be reduced.

(Movement of Dropout-prevention Portions 80)

Next, a movement of the dropout-prevention portions 80 will be explained.

The projecting portions 81 provided in the main body portion 40 are fitted into the hole portions 82 provided in the holding portion 50, so that when the vibration-absorption portions 70 are broken, the projecting portions 81 become a state of being caught on inner edges of the hole portions 82 in a state wherein the projecting portions 81 are fitted into the hole portions 82.

Consequently, the holding portion 50 becomes a state of, i.e., being hung in midair in the hole portions 82 of the main body portion 40 so as to prevent a dropout of the holding portion 50 from the main body portion 40.

Incidentally, by appropriately modifying a material configuring the first resin spring 72, the second resin spring 73, or the clamp 10, or a configuration aspect (for example, width, thickness, tilt, number, and length), and by changing a resonance frequency range, an anti-vibration performance can be adjusted according to the vibration having a different frequency.

(Second Embodiment)

With FIGS. 11 to 14, a second embodiment of the present invention will be explained.

A characteristic of the present embodiment is that a position of dropout-prevention portions 130 is changed.

Namely, in the embodiment (hereinafter, called the "first embodiment") explained earlier with FIGS. 1 to 10, as shown in FIG. 3, the dropout-prevention portions 80 are disposed in a long-side direction of the pipe 30 (the long object).

On the other hand, in the second embodiment, as shown in FIGS. 11 to 14, the dropout-prevention portions 130 are disposed in a direction intersecting relative to the long-side direction of the pipe 30 (the long object), for example, in a direction intersecting at a 90-degree angle.

Figure 14:
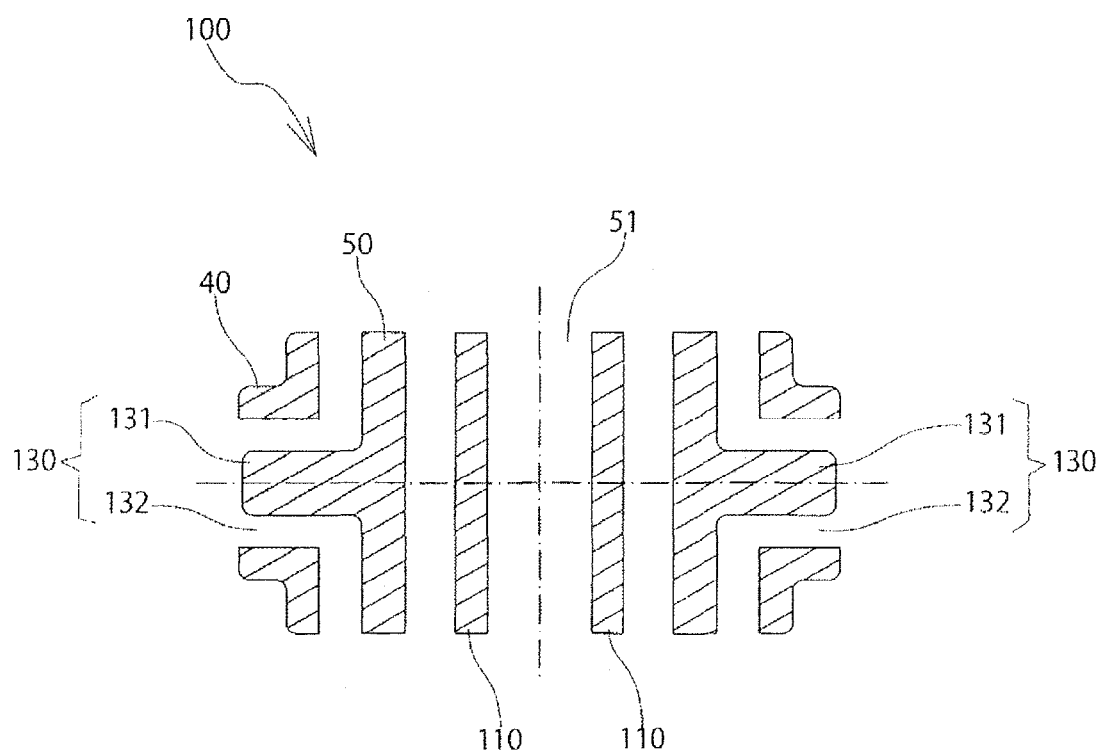
FIG. 14 is a cross-sectional view taken along a line F-F in FIG. 11.

Namely, as shown in FIG. 14, the dropout-prevention portions 130 comprise the following respective portions.

Incidentally, each portion of the dropout-prevention portions 130 is not limited to the following (1) and (2).

(1) Projecting Portions 131

Figure 11:
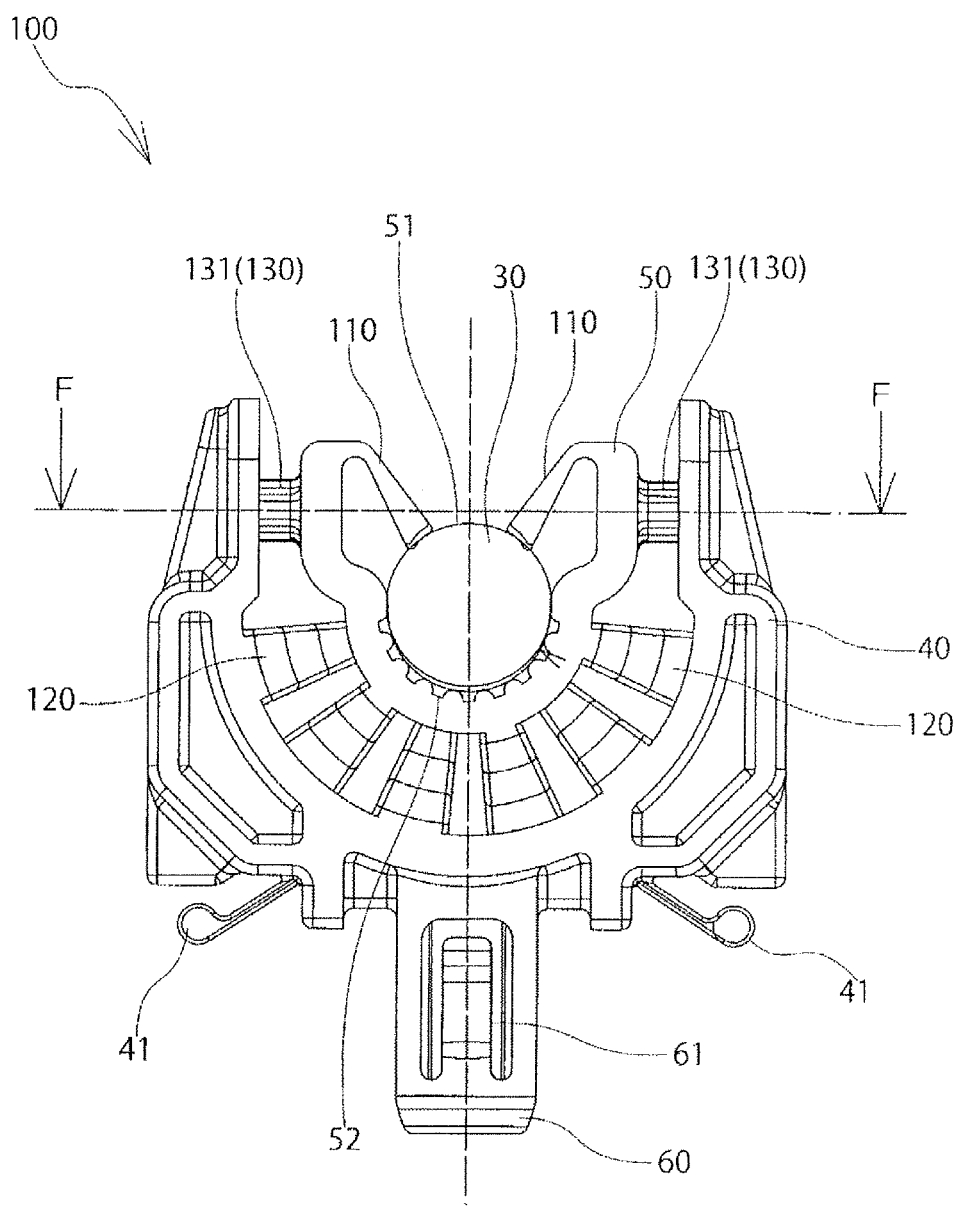
FIG. 11 shows a second embodiment of the present invention, and is a front view of the clamp.

As shown in FIGS. 11 and 14, projecting portions 131 are formed as a right-and-left pair in the holding portion 50, and extend toward the main body portion 40.

Specifically, the projecting portions 131 are respectively positioned in right-and-left upper end portions, which are free end portions of the holding portion 50 having approximately a U shape, and extend toward the right-and-left upper end portions, which are free end portions of the main body portion 40 having approximately a U shape likewise from an outer circumferential face of each upper end portion.

(2) Hole Portions 132

As shown in FIG. 14, the projecting portions 131 are fitted in hole portions 132, and the hole portions 132 are formed in the main body portion 40 as a right-and-left pair.

Figure 12:
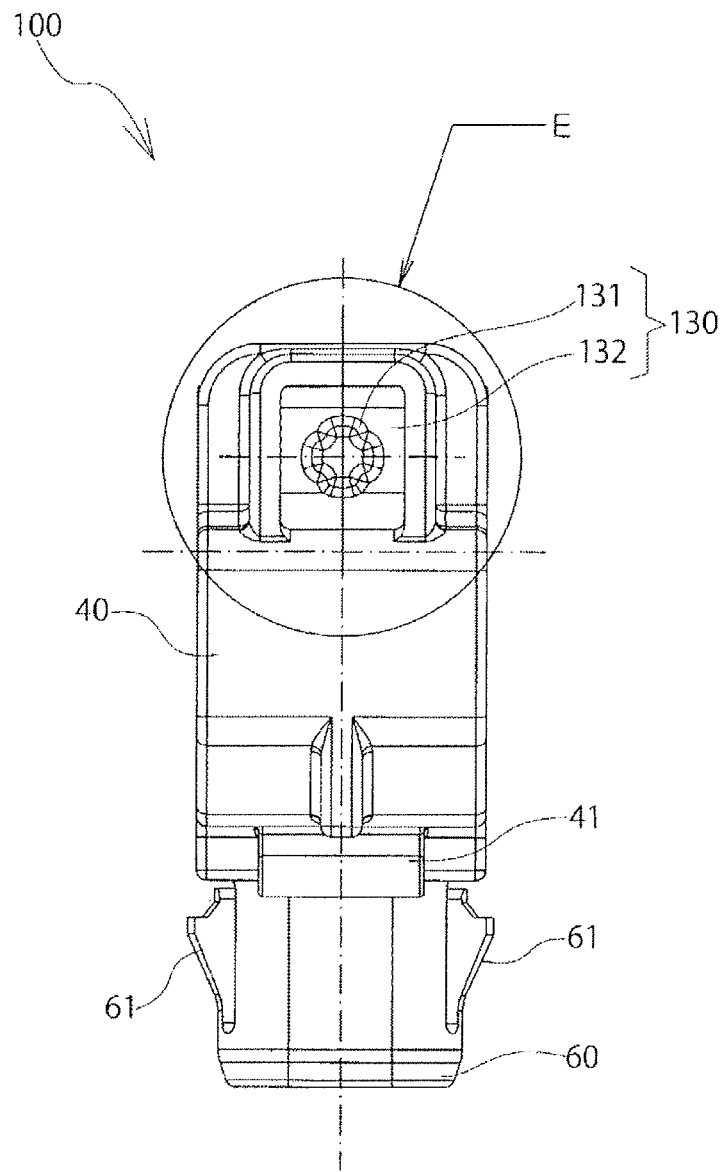
FIG. 12 is a side view of FIG. 11.
Figure 13:
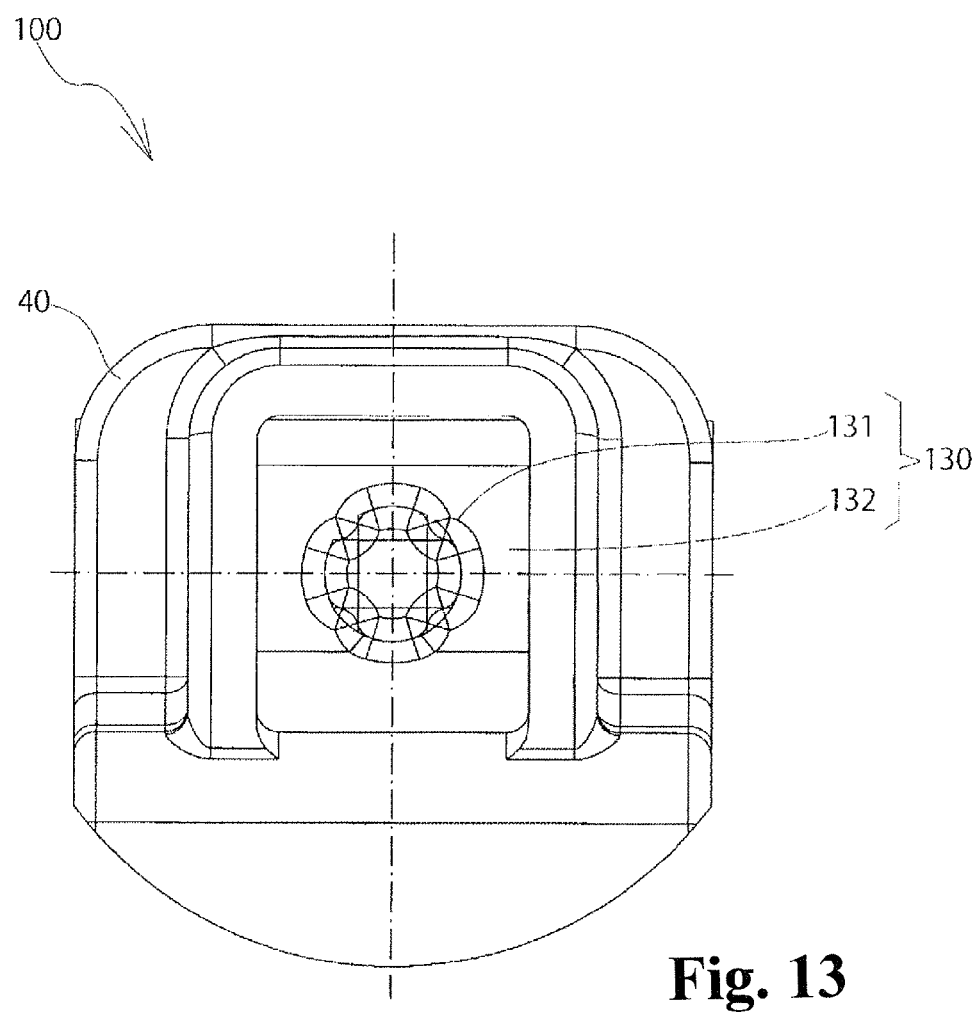
FIG. 13 is an enlarged view of an E portion in FIG. 12.

Specifically, as shown in FIGS. 12 and 13, the hole portions 132 are respectively positioned in the right-and-left upper end portions, which are the free end portions of the main body portion 40 having approximately the U shape, and as shown in FIG. 14, the hole portions 132 pass through in a right-and-left width direction of the main body portion 40. An inner diameter of the hole portion 132 is set in an outer diameter of the projecting portion 131 or above. In the present embodiment, the inner diameter of the hole portion 132 is set large so as not to interfere with a movement of the holding portion 50 by vibration-absorption portions 120.

On the other hand, as shown in FIG. 11, holding pieces 110 are respectively positioned in right-and-left upper end portions, which are free end portions of the holding portion 50, and are formed in a folded-back shape.

According to a clamp 100 with respect to the present embodiment, by the dropout-prevention portions 130, the dropout of the holding portion 50 relative to the main body portion 40 can be prevented not only in the up-and-down direction in FIG. 11, but also relative to the vibration in the right-and-left direction.

(Third Embodiment)

With FIGS. 15 to 17, a third embodiment of the present invention will be explained.

A characteristic of the present embodiment is that positions of vibration-absorption portions 220 to 250 are changed.

Namely, in the first embodiment explained earlier, the vibration-absorption portions are disposed in a lower half portion of the holding portion, so that an anti-vibration effect in a longitudinal direction can be expected. On the other hand, in the third embodiment, the vibration-absorption portions are disposed even in an upper half portion in addition to the lower half portion of the holding portion, and the vibration-absorption portions are disposed equally across a whole circumference of the holding portion. Consequently, in the third embodiment, in addition to the anti-vibration effect in the longitudinal direction, the anti-vibration effect in a crosswise direction can also be expected so as to be capable of improving flexibility in an attachment direction regardless of the attachment direction of the clamp.

Figure 15:
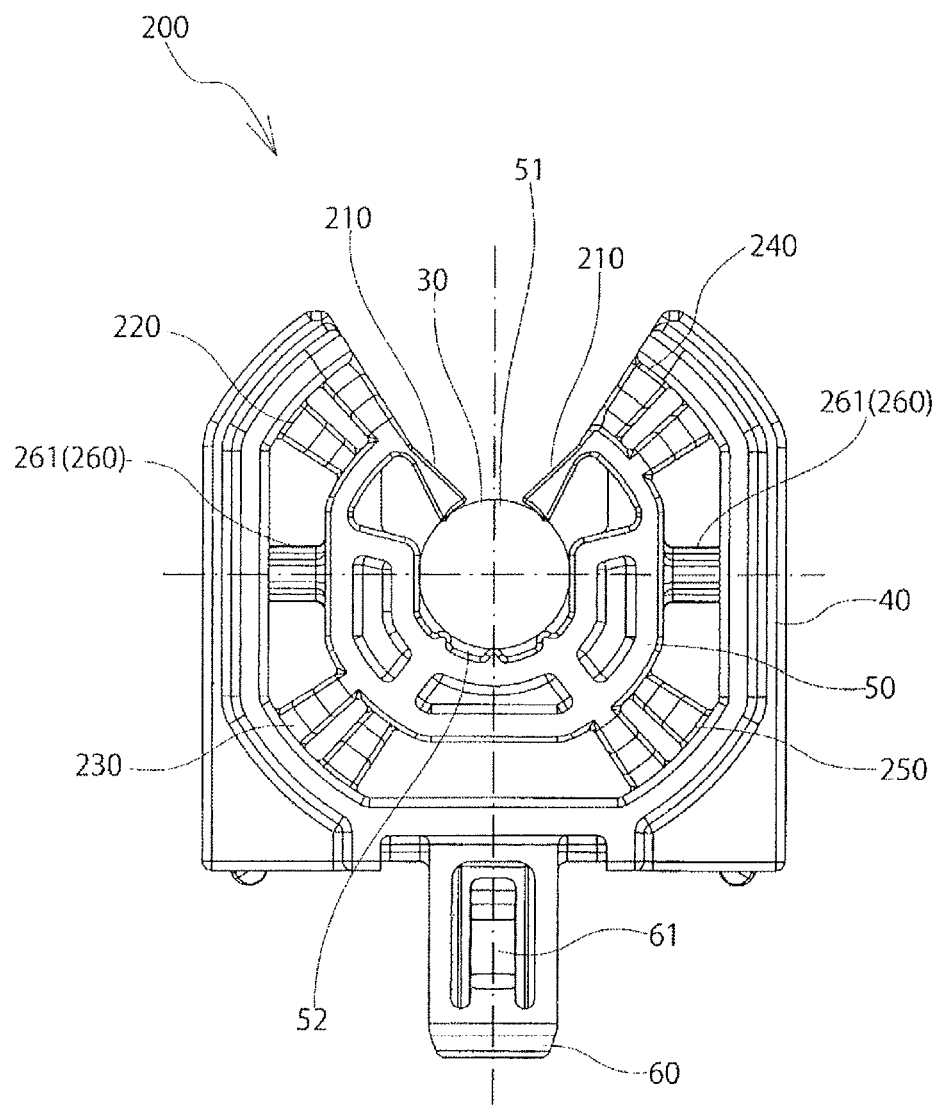
FIG. 15 shows a third embodiment of the present invention, and is a front view of the clamp.
Figure 16:
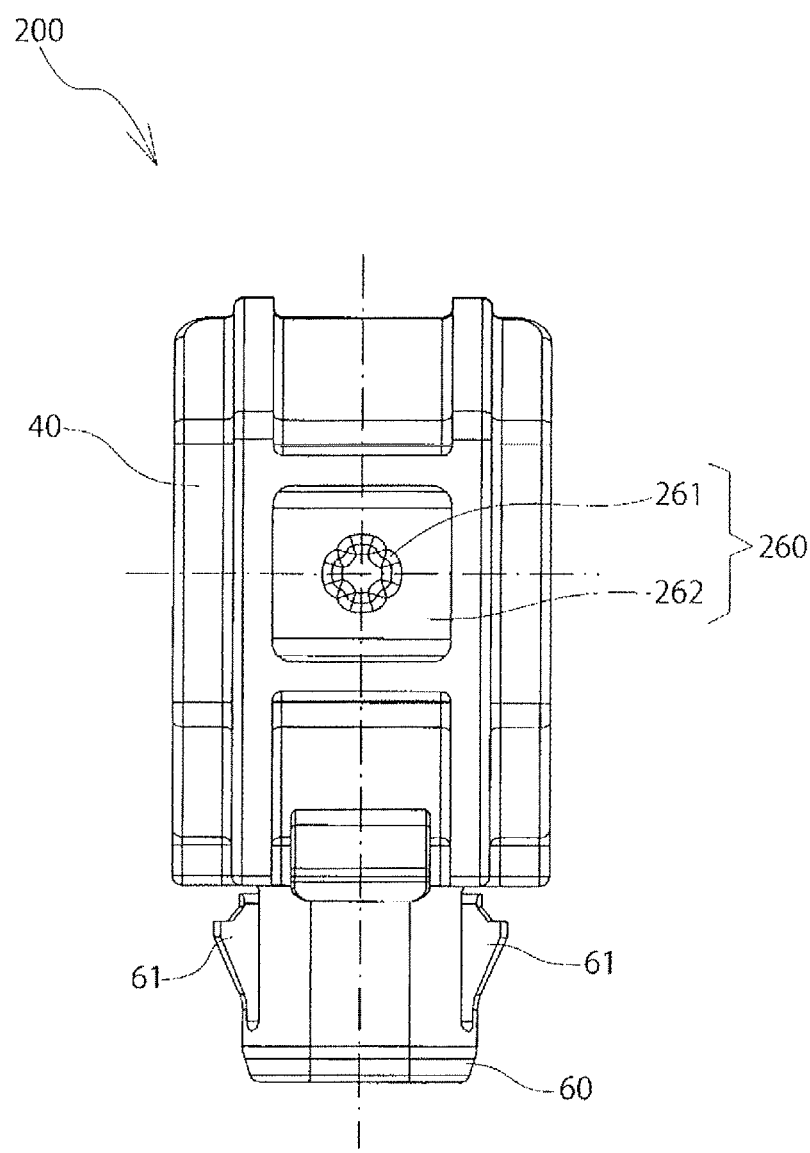
FIG. 16 is a side view of FIG. 15.

Namely, as shown in FIG. 15, the vibration-absorption portions 220 to 250 are positioned in four directions of the approximately circular housing space 52 of the holding portion 50, and are disposed with a total of four pieces at approximately 90-degree intervals.

Dropout-prevention portions 260 of the present embodiment employ the same structure as the dropout-prevention portions 130 of the second embodiment explained earlier with FIGS. 11 to 14. As shown in FIG. 15, the dropout-prevention portions 260 are positioned in a diametrical direction of the approximately circular housing space 52.

As shown in FIG. 15, the first to fourth vibration-absorption portions 220 to 250 with the total of four pieces are disposed in the up-and-down direction thereof by sandwiching the dropout-prevention portions 260 positioned in the diametrical direction.

Namely, as shown in FIG. 15, the first and third vibration-absorption portions 220 and 240 are respectively positioned on an upper side of the dropout-prevention portions 260, and are respectively formed in the right-and-left upper end portions, which are the free end portions of the main body portion 40 having approximately the U shape. The second and fourth vibration-absorption portions 230 and 250 are respectively positioned on a lower side of the dropout-prevention portions 260, and are respectively formed in a middle of a length of the main body portion 40 having approximately the U shape.

A structure of the first to fourth vibration-absorption portions 220 to 250 employ the same structure as the vibration-absorption portions 70 of the first embodiment explained earlier with FIGS. 1 to 10. Although it is not shown in the figures, the structure of the first to fourth vibration-absorption portions 220 to 250 are configured by a first resin spring and a second resin spring which reciprocally have a different direction.

On the other hand, as shown in FIG. 15, holding pieces 210 abut against the first and third vibration-absorption portions 220 and 240; are respectively positioned in the right-and-left upper end portions, which are the free end portions of the holding portion 50; and are formed in the folded-back shape.

According to a clamp 200 with respect to the present embodiment, regardless of a mounting direction thereof, the pipe 30 (the long object) can be prevented from dropping out.

Namely, as illustrated as an example in the first embodiment explained earlier with FIGS. 1 to 10, the clamp 200 may be vertically mounted in such a way that the fixed portion 60 faces downward, and the opening 51 of the holding portion 50 opens upward (see FIG. 4).

Figure 17:
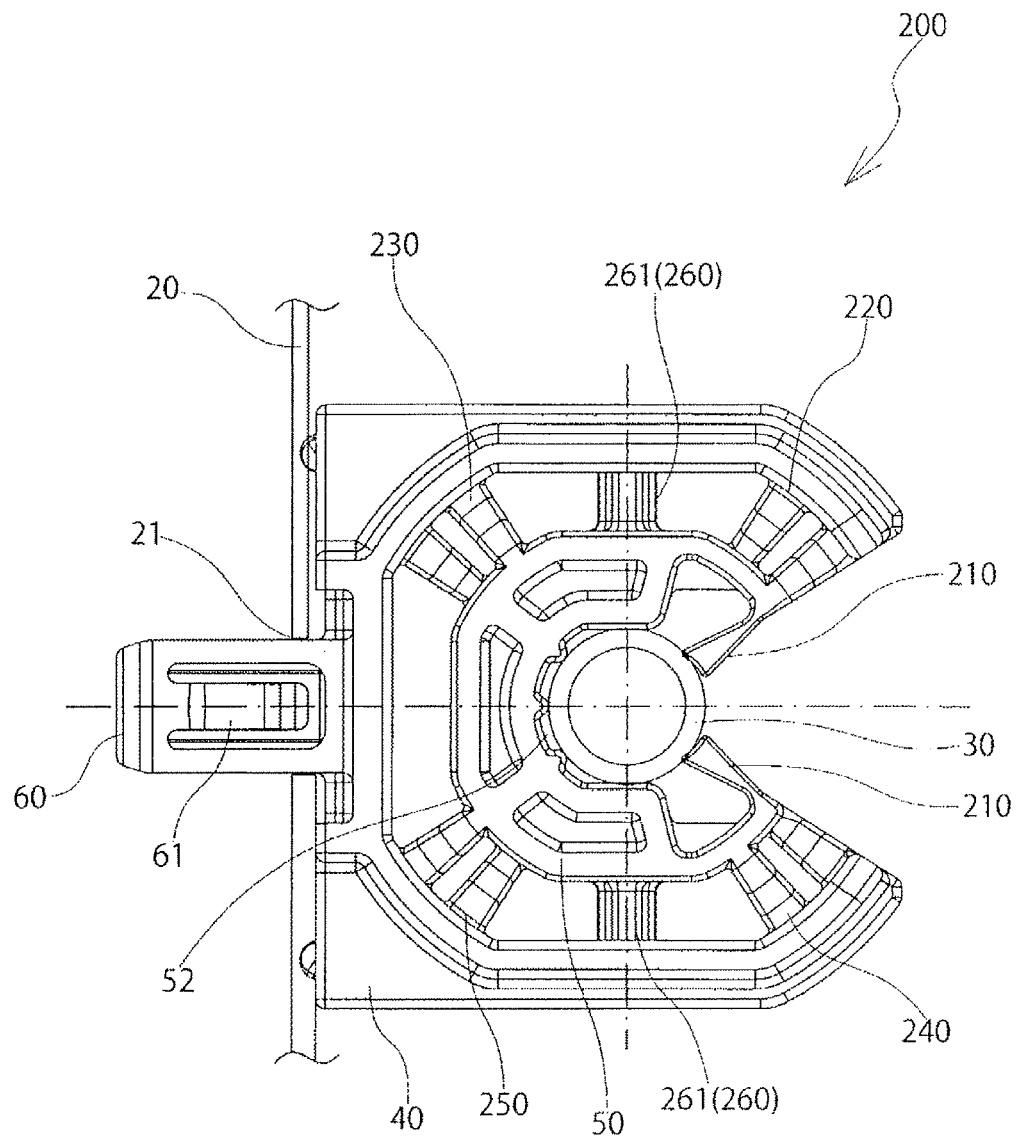
FIG. 17 is an explanatory view showing an attachment state in FIG. 15.

Also, as shown in FIG. 17, the clamp 200 may be horizontally mounted in such a way that the fixed portion 60 and the opening 51 face sideways. In a case wherein the clamp 200 is horizontally mounted, the holding piece 210 on a lower side receives a weight of the pipe 30 (the long object), so that the holding piece 210 becomes easily bendable. As a result, there is a possibility that the pipe 30 will drop out.

In the present embodiment, the vibration-absorption portions 220 to 250 are disposed equally relative to the opening 51, i.e., are disposed in the four directions approximately at the 90-degree intervals so as to prevent the holding piece 210 positioned on the lower side from disproportionately bending. As a result, the pipe 30 can be prevented from dropping out.

Also, in the present embodiment, the dropout-prevention portions 260 (including projecting portions 261 and hole portions 262) which are the same structure as the dropout-prevention portions 130 of the second embodiment explained earlier with FIGS. 11 to 14, are employed. Accordingly, the dropout of the holding portion 50 relative to the main body portion 40 can be prevented not only in the up-and-down direction in FIG. 15, but also relative to the vibration in the right-and-left direction.

In the present embodiment, it is essential that the vibration-absorption portions are formed at least with three pieces or more, and additionally it is essential that the adjacent vibration-absorption portions are disposed such that the angle formed relative to the center of the holding portion is equal, or such that the distance between the adjacent vibration-absorption portions is equal. In the present embodiment, although the vibration-absorption portions are disposed in four places at 90-degree intervals in approximately a square shape, the vibration-absorption portions are not limited to the above, and may be disposed in three places at 120-degree intervals in approximately an equilateral triangle shape; be disposed in five places at 72-degree intervals in approximately an equilateral pentagon shape; be disposed in six places at 60-degree intervals in approximately an equilateral hexagon shape; or be disposed in seven places or more. Incidentally, in a case wherein the opening is positioned between the adjacent vibration-absorption portions, the intervals or the distance are allowed to differ. Also, besides a case wherein the opening is not positioned in between, and the angle and the distance between the adjacent vibration-absorption portions are exactly the same, in a case wherein a placement is difficult due to a design or molding, a small error is allowed.

All contents of the specification, claims, drawings, and abstract of Japanese Patent Application No. 2010-232220 filed on Oct. 15, 2010 are cited in their entireties herein, and are incorporated as a disclosure of the specification of the present invention.

What is claimed is:

1. A clamp, comprising:
   a holding portion provided with an opening for inserting a long object, and holding the long object;
   a main body portion disposed with a predetermined space on an outer circumferential face of the holding portion; and
   a fixed portion for fixing to an attached member from the main body portion, the holding portion, the main body portion, and the fixed portion being connected,
   the fixed portion being fixed to the attached member, so that the long object is attached to the attached member,
   wherein a vibration-absorption portion for reducing a transmission of a vibration is provided to support between the holding portion and the main body portion, the vibration-absorption portion being composed of a plurality of resin springs formed in a plate shape,
   one end portion of the resin spring is provided to connect to the holding portion, and is positioned in one end portion of the holding portion in an axial direction of the long object, and
   the other end portion of the resin spring is provided to extend in the axial direction of the long object and connect to the main body portion, the other end portion being positioned in an end portion of the main body portion on an opposite side to the one end portion of the holding portion in the axial direction of the long object, and
   the holding portion, the main body portion, and the vibration-absorption portion are made from a same resin material.

2. A clamp according to claim 1, wherein the vibration-absorption portion bends in an intersecting direction intersecting relative to the axial direction of the long object.

3. A clamp according to claim 1, wherein in one adjacent resin spring among the plurality of resin springs,
   the one end portion is provided to connect to the holding portion and is positioned in the one end portion in the holding portion; and
   the other end portion is provided to extend in the axial direction of the long object and to connect to the main body portion, the other end portion being positioned in the end portion on the opposite side in the main body portion; and
   in another adjacent resin spring,
   the one end portion is provided to connect to the holding portion and is positioned in an end portion on the opposite side in the holding portion; and
   the other end portion is provided to extend in the axial direction of the long object and to connect to the main body portion, the other end portion being positioned in the one end portion in the main body portion.

4. A clamp according to claim 1, wherein the holding portion and the main body portion are separated, except for being connected at the vibration-absorption portion.

5. A clamp according to claim 1, wherein the holding portion and the main body portion are provided with:
   a projecting portion provided in either the holding portion or the main body portion to extend toward the other member so that the holding portion does not drop out of the main body portion when the vibration-absorption portion is broken; and
   a hole portion provided in the other ember, and receiving the projecting portion.

6. A clamp according to claim 1, wherein the vibration-absorption portion is formed at least with three pieces or more, and adjacent vibration-absorption portions are disposed to equally form an angle relative to a center of the holding portion.

7. A clamp according to claim 1, wherein the vibration-absorption portion is formed at least with three pieces or more, and adjacent vibration-absorption portions are disposed to have an equal distance inbetween.

* * * * *